United States Patent
Håkansson

(10) Patent No.: US 10,041,211 B2
(45) Date of Patent: Aug. 7, 2018

(54) METHOD OF INCREASING THE FILLER CONTENT IN PAPER OR PAPERBOARD

(71) Applicant: Stora Enso OYJ, Helsinki (FI)

(72) Inventor: Phillip Håkansson, Sölvesborg (SE)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 15/325,157

(22) PCT Filed: Jul. 7, 2015

(86) PCT No.: PCT/IB2015/055137
§ 371 (c)(1),
(2) Date: Jan. 10, 2017

(87) PCT Pub. No.: WO2016/005906
PCT Pub. Date: Jan. 14, 2016

(65) Prior Publication Data
US 2017/0183822 A1     Jun. 29, 2017

Related U.S. Application Data

(60) Provisional application No. 62/023,308, filed on Jul. 11, 2014.

(51) Int. Cl.
| | | |
|---|---|---|
| *D21H 17/68* | (2006.01) | |
| *D21H 17/65* | (2006.01) | |
| *D21H 17/66* | (2006.01) | |
| *D21H 17/67* | (2006.01) | |
| *D21H 23/04* | (2006.01) | |
| *C09C 1/00* | (2006.01) | |
| *C09C 1/02* | (2006.01) | |
| *C09C 1/28* | (2006.01) | |

(52) U.S. Cl.
CPC ........... *D21H 17/68* (2013.01); *C09C 1/0081* (2013.01); *C09C 1/021* (2013.01); *C09C 1/28* (2013.01); *D21H 17/65* (2013.01); *D21H 17/66* (2013.01); *D21H 17/675* (2013.01); *D21H 23/04* (2013.01)

(58) Field of Classification Search
CPC ........ D21H 17/68; D21H 17/65; D21H 17/66; D21H 17/675; D21H 23/04; C09C 1/0081; C09C 1/021; C09C 1/28
USPC ....................................................... 162/164.1
See application file for complete search history.

(56) References Cited

U.S. PATENT DOCUMENTS

| 2006/0162884 A1 | 7/2006 | Gane et al. |
| 2009/0017235 A1 | 1/2009 | Bayes et al. |

FOREIGN PATENT DOCUMENTS

| DE | 317948 C | 1/1920 |
| EP | 0356406 A1 | 2/1990 |
| GB | 682664 A | 11/1952 |
| GB | 1295264 A | 11/1972 |
| WO | 9820079 A1 | 5/1998 |
| WO | 9945202 A1 | 9/1999 |
| WO | 0140576 A1 | 6/2001 |

OTHER PUBLICATIONS

International Search Report for PCT/IB2015/055137, dated Oct. 20, 2015.
Khoietsyan E. A. et al "Properties of high ash content paper for gravure printing", Abstract Bulletin of the Institute of Paper Chemistry, 1987, vol. 58, No. 5, p. 661.

*Primary Examiner* — Mark Halpern
(74) *Attorney, Agent, or Firm* — Greer, Burns & Crain Ltd.

(57) ABSTRACT

The invention relates to a method of making paper or paperboard comprising the steps of; a. providing a stock suspension; b. adding a mixture of alkali-metal silicate and precipitated calcium carbonate to said stock suspension; c. adding an acidic media to said stock suspension substantially directly before and/or after step (b) d. forming a web of the stock suspension obtained in step (d) e. drying said web. The addition of a mixture of alkali-metal silicate and PCC and of an acidic media to the stock suspension in accordance with the invention improves the bonding between the fibers and the filler (PCC), whereby problems related to dusting is decreased. Moreover, the method enables the addition of a higher amount of fillers to the paper without substantially affecting the strength.

7 Claims, 1 Drawing Sheet

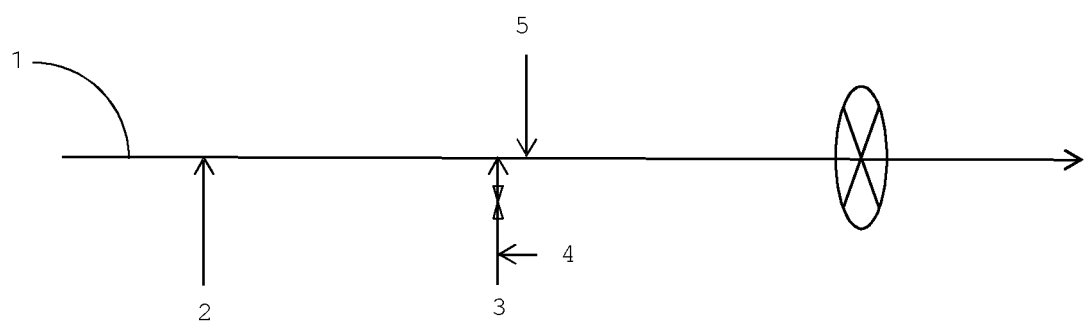

METHOD OF INCREASING THE FILLER CONTENT IN PAPER OR PAPERBOARD

This application is a 371 of PCT/IB2015/055137 filed 7 Jul. 2015, which claims priority to U.S. provisional patent application No. 62/023,308 filed Jul. 11, 2014.

FIELD OF INVENTION

The invention relates to a method of making paper or paperboard which method enables an increased content of filler in the paper or paperboard.

BACKGROUND

The greater part of all paper produced contains fillers in the form of mineral material. The original reason for use of fillers is economical as a more expensive fibre material can be replaced by a cheaper mineral material. In addition, many of the paper properties are ameliorated. Above all, improved printability properties are obtained by improving the surface smoothness, opacity and whiteness of the paper. The absorption of printing ink is higher and more even, the picture representation is improved and the paper gloss after calendering can be improved. Other advantages involve better dimensional stability, a better appearance and a better "sensation".

As mentioned above, the ability of the filler to increase the brightness of the finished paper is important. This results in a reduced or eliminated need to add expensive optical whitening agents. Calcium carbonate is the most frequently used conventional filler but other fillers are also used on a small scale, such as clay, titanium dioxide, talc and silicon dioxide (silica). Also organic fillers are described in the literature. Examples of these are polymers of urea or formaldehyde.

Calcium carbonate exists in several forms when being used as filler and the majority of fine papers contain calcium carbonate up to 25% by weight. Ground marble, ground chalk and precipitated calcium carbonate are the most frequent types. The last mentioned type, precipitated calcium carbonate, is often called PCC, an abbreviation for the English term "Precipitated Calcium Carbonate". The use of PCC has increased in the last few years and today PCC is the dominant filler at production of fine paper in Sweden.

However, adding fillers causes reduction in the strength of the paper, so there is a practical limit to the amount of fillers normally added to the paper making stock suspension. Another problem connected to a high amount of fillers in the paper is dusting, i.e. the tendency of a paper surface to shed loose and weakly bonded particles, such as PCC originating from fillers, which may accumulate on the printing machinery.

DESCRIPTION

One object of the present invention is to allow for the paper maker to increase the filler content of the paper or paper board.

Another object of the invention is to decrease the dusting tendency of paper or paper board.

These and further problems are solved by the present invention.

The invention relates to a method of making paper or paperboard comprising the steps of;
a. providing a stock suspension;
b. adding a mixture of alkali-metal silicate and precipitated calcium carbonate to said stock suspension;
c. adding an acidic media to said stock suspension substantially directly before and/or after step (b)
d. forming a web of the stock suspension obtained in step (d)
e. drying said web.

The addition of a mixture of alkali-metal silicate and PCC and of an acidic media to the stock suspension in accordance with the invention improves the bonding between the fibers and the filler (PCC), whereby problems related to dusting is decreased. Moreover, the method enables the addition of a higher amount of fillers to the paper without substantially affecting the strength.

The mixture of PCC and alkali-metal silicate is basic and might e.g. have a pH of around 12. When said mixture is brought into contact with an acidic media in the presence of the fibers in the stock, the PCC becomes anionic and thereby stronger bonds between the fibers and the PCC are formed. The alkali-metal silicate forms weak complexes with PCC, which render the reaction with the acid media more effective. Alkali-metal silicate may be added to a PCC dispersion in an amount of e.g. 0.3-2% or 0.5-2% by weight (calculated on the dry weight of PCC).

As used herein, the expression "directly before and/or after" may be within a time span of below 30 seconds before or after the step (b), or preferably within a time span of between 1 and 10 seconds before and/or after step (b).

The alkali-metal silicate may be in the form of an aqueous solution, which solution is mixed with PCC particles before addition to the stock suspension. The alkali-metal silicate is preferably sodium silicate (e.g. in the form of water glass) and/or potassium silicate.

Preferably, the acidic media is added to the stock suspension directly after the addition of the mixture of PCC and sodium silicate. This reduces the tendency of the acidic media to react with PCC residues present in the stock suspension from e.g. the circulated white water forming carbon dioxide.

Cationic active starch, and/or cationic synthetic polymer, is preferably added to the stock suspension, prior or after the addition of the mixture of the PCC and sodium silicate and the acidic media (i.e. before step (b) or after step (c)). Cationic starch, and/or cationic synthetic polymer, is added to stabilize the balance between the charges in the wet-end chemistry. The cationic active starch may be added to the suspension in an amount of e.g. 5-15 kg/ton produced paper. The cationic synthetic polymer may be added to the suspension in an amount of e.g. 100-1000 g/ton.

The acidic media may comprise any one of mineral acids, acidic metal salts and carbon dioxide. In one mode, the acidic media comprises an acidic salt, preferably an aluminum salt such as, aluminum sulfate, poly-aluminum nitrate, poly-aluminum chloride (PAC) or alum (e.g. potassium aluminum sulfate). The acidic media, e.g. PAC, may be added in an amount of 1-5 kg/ton paper. When an acidic media comprising water soluble aluminum salt is added to the stock suspension, which stock comprises PCC and alkali metal silicate, part of the alkali metal silicate form polyaluminosilicates (PAS) which has the benefit of keeping a high anionic charge of the PCC within a broad span of pH values.

BRIEF DESCRIPTION OF THE DRAWINGS

FIG. 1 illustrates an example process of making a stock suspension in accordance with the invention.

DETAILED DESCRIPTION

According to the invention there is provided a method where a mixture of an alkali-metal silicate and precipitated calcium carbonated is added to a stock suspension, followed or preceded by the addition of an acidic media to the stock suspension. This way, the affinity of the PCC/alkali-metal complexes to the fibers is enhanced, which allows for a higher amount of fillers to be added to the stock suspension and problems with e.g. dusting is avoided.

The PCC particles have usually a particle size of 2-3 μm. The alkali-metal silicate is preferably provided in the form of a solution (e.g. water glass) and mixed into the flow of the PCC dispersion.

By "stock-suspension" is meant a paper-making stock-suspension comprising cellulosic fibers. The stock-suspension may comprise virgin pulp suspension (long-fiber pulp, short fiber pulp, mechanical pulp, thermomechanical pulp, chemical pulp, microfiber pulp, nanofiber pulp), recycled pulp suspension (recycled pulp, reject, fiber fraction from the fiber recovery filter), additive suspension and solids-containing filtrate. Such additive suspension may, e.g., comprise retention aids, surfactants, de-foaming agents, sizing agents or other wet-end chemicals per see known to the skilled person.

The mixture of PCC and alkali-metal silicate may be continuously fed to a flow of a stock-suspension in the short circulation of the paper making machine, i.e. into the fibrous web or paper making stock suspension. The addition point can e.g. be anywhere between the machine chest and the headbox. The mixture may be added to the stock-suspension in an amount of between 20-25% by weight. The acidic media may be added in an amount of 1-5 kg/ton produced paper, 1 to 10 seconds downstream or upstream of said addition of PCC and alkali-metal silicate.

The method of the invention can be used to produce any kind of paper or paper board. The invention is of particular value in the production of fine paper, super-calendered paper or newsprint paper. The increase of filler in the newsprint paper, which the present invention makes possible, increases the ash content whereby the printing quality and the opacity of the paper is improved.

By the method of the invention, the total percentage of filler in the paper can be increased with 5% (i.e. the filler amount can increase from 20% to 25%). The content of fillers in uncoated fine paper can be e.g. 25-35% by weight based on dry paper. In newsprint paper, the content of fillers added to the pump can be e.g. 10-15%.

The invention is further described by way of an example and with reference to FIG. 1.

In accordance with the example, a pulp suspension (1) comprising 30% softwood kraft pulp and 70% hardwood kraft is provided. A cationic starch (2) is added to said suspension in an amount of around 10 kg/ton paper. Water glass, comprising around 28-32% sodium silicate, is added to the flow of a 20% dispersion PCC (3) and mixed in a static mixer, substantially directly before addition to the stock suspension (1). In this example, the dosage of water glass is 3.33 kg per 250 kg PCC dry weight. The mixture of PCC and sodium silicate is added to the stock suspension in an amount of 25% by weight of the thus formed paper. 5 seconds after the addition of said mixture, PAC (5) is added to the stock suspension in an amount of 3 kg/ton formed paper.

Further wet-end chemicals, conventionally used in paper-making, may also be added to the stock suspension. Thereafter, the stock is fed to the head box (not shown) of a papermaking machine.

The invention claimed is:

1. A method of making paper or paper board on a papermaking machine having a headbox, the method comprising the steps of;
    a. providing a papermaking stock suspension comprising cellulosic fibers;
    b. adding a mixture of alkali-metal silicate and precipitated calcium carbonate to said stock suspension;
    c. adding an acidic media to said stock suspension substantially directly before and/or after step (b), wherein the addition of acidic media is before the headbox;
    d. forming a web of the stock suspension obtained in step (c); and
    e. drying said web.

2. The method according to claim 1, wherein said alkali-metal silicate is sodium silicate and/or potassium silicate.

3. The method according to claim 1, wherein the acidic media is added to the stock suspension in step (c) substantially directly after step (b).

4. The method according to claim 1, wherein the acidic media comprises any one of mineral acids, acidic metal salts and carbon dioxide.

5. The method according to claim 4, wherein the acidic media comprises an acidic salt.

6. The method according to claim 5, wherein the acidic salt comprises ammonium sulfate, aluminum sulfate, poly-aluminum nitrate, polyaluminium chloride or combinations thereof.

7. The method according to claim 1, wherein cationic starch and/or cationic synthetic polymer is added to the stock suspension.

\* \* \* \* \*